No. 718,802. PATENTED JAN. 20, 1903.
C. L. TAYLOR.
AUTOMATIC BRAKE.
APPLICATION FILED SEPT. 8, 1902.
NO MODEL. 2 SHEETS—SHEET 1.
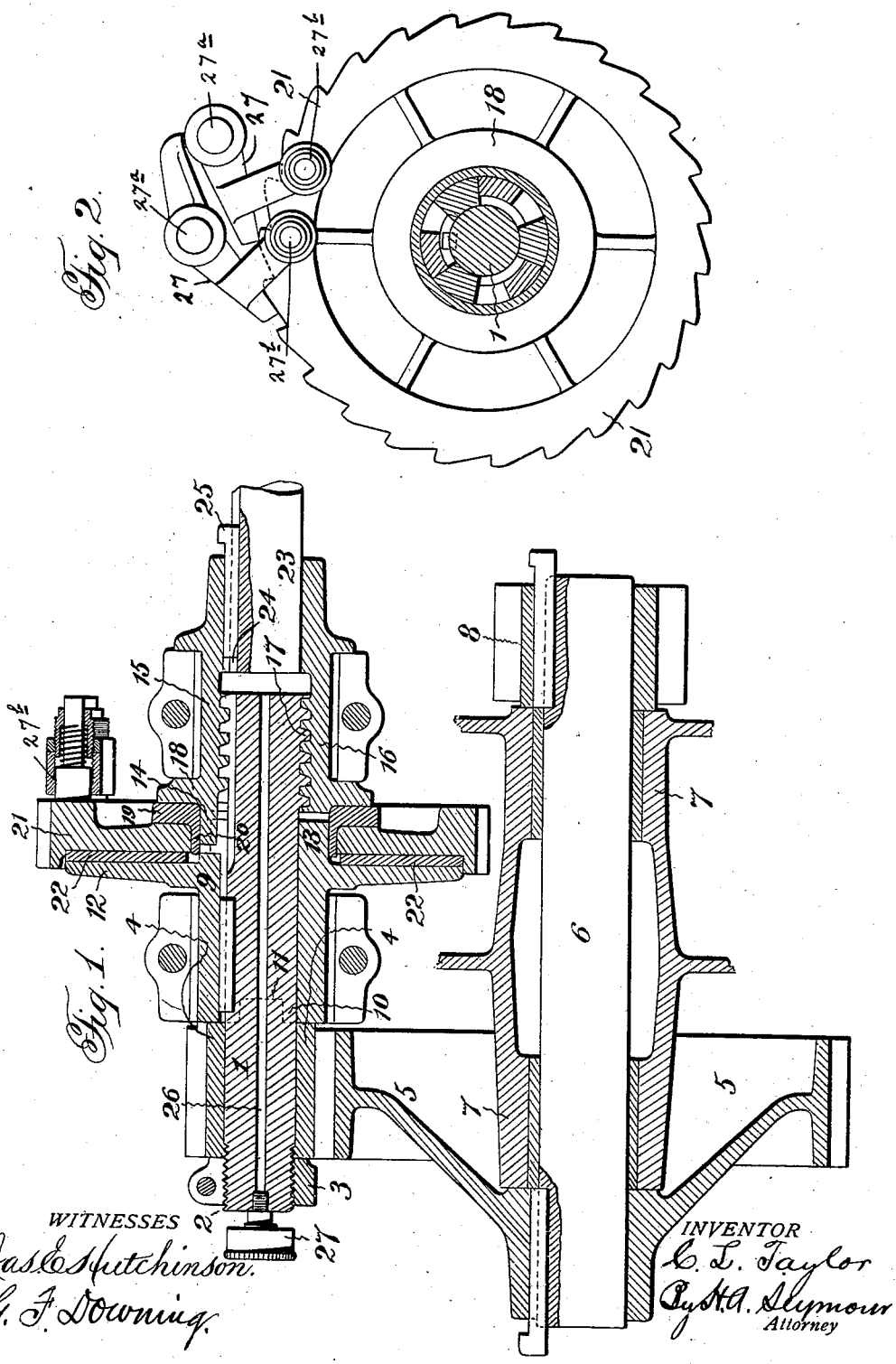
WITNESSES
Jas. E. Hutchinson.
G. F. Downing.
INVENTOR
C. L. Taylor
By H. A. Seymour
Attorney

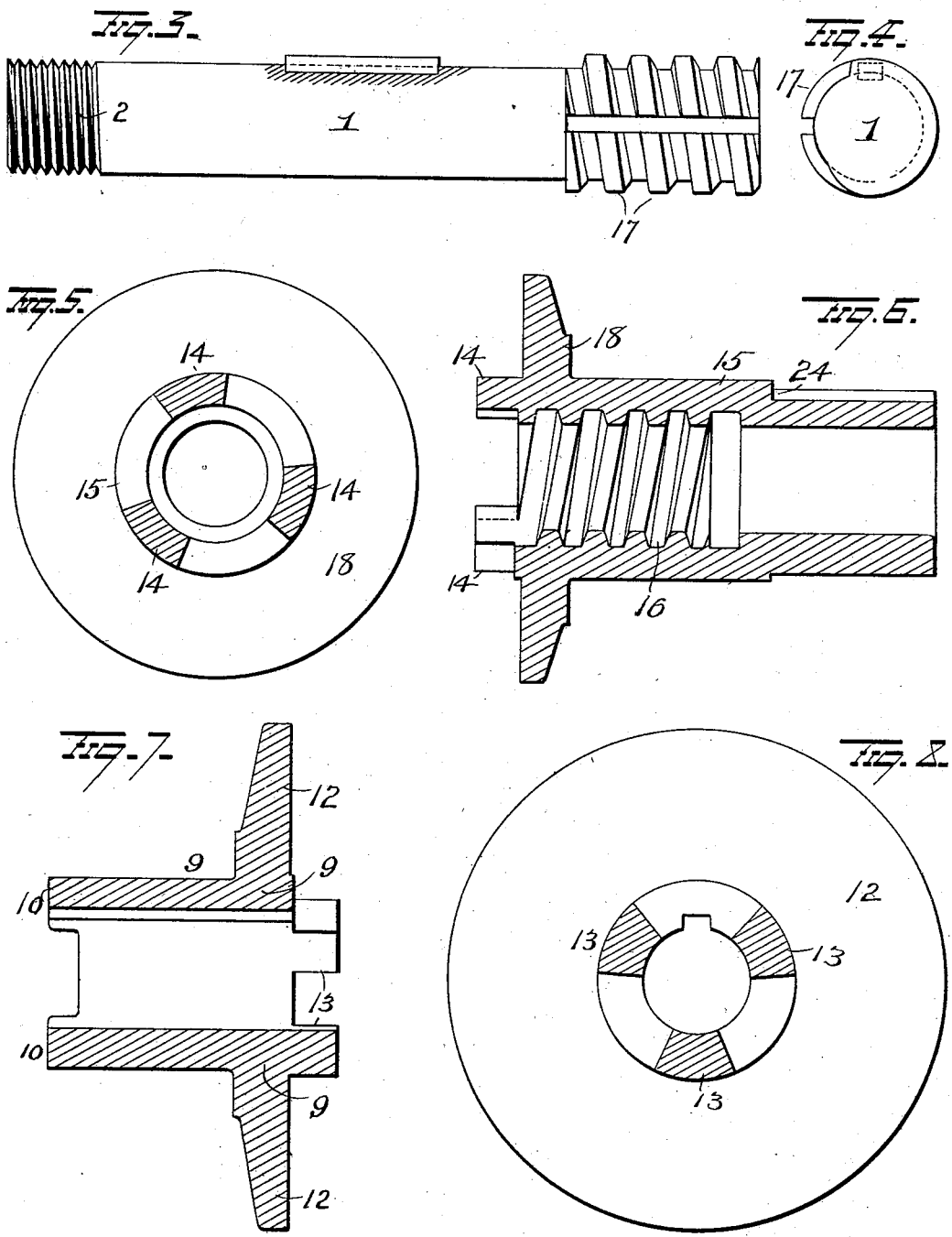

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

AUTOMATIC BRAKE.

SPECIFICATION forming part of Letters Patent No. 718,802, dated January 20, 1903.

Application filed September 8, 1902. Serial No. 122,592. (No model.)

*To all whom it may concern:*

Be it known that I, CLARENCE L. TAYLOR, of Alliance, in the county of Stark and State of Ohio, have invented certain new and useful Improvements in Automatic Brakes; and I do hereby declare the following to be a full, clear, and exact description of the invention, such as will enable others skilled in the art to which it appertains to make and use the same.

My invention relates to an improvement in automatic brakes designed particularly for use on hoisting-machines; and it consists in the parts and combinations of parts, as will be more fully described, and pointed out in the claims.

In the accompanying drawings, Figure 1 is a view in longitudinal section of my improved brake. Fig. 2 is a view in section looking toward the ratchet-wheel. Fig. 3 is a view in elevation of the screw-shaft. Fig. 4 is an end view of same. Figs. 5 and 6 are end and sectional views, respectively, of sleeve 15; and Figs. 7 and 8 are section and end views, respectively, of sleeve 9.

1 represents a shaft which may be coupled up as hereinafter explained with any suitable source of power. In overhead traveling cranes, to which class of machines this brake is specially applicable, this shaft 1 would preferably be coupled up to the armature-shaft of the hoist-motor and drive the hoisting-drum, and for the purpose of illustrating the operation of the brake or clutch I will describe it as applied to the hoisting mechanism of an overhead traveling crane. The shaft 1 is provided at its free end with screw-threads 2 for the attachment of the split clamping-nut 3, and loosely mounted on the shaft and bearing against the nut 3 is the pinion 4, which latter transmits motion to the gear 5, keyed to shaft 6 at one end of the latter. This shaft 6 is supported in a suitable bearing 7 and carries at its opposite end the smaller pinion 8, which may transmit motion direct to the gear-wheel on the hoisting-drum or to intermediate gearing, as may be necessary.

Keyed to the shaft 1 is the sleeve 9, provided at its outer end with teeth 10, which intermesh with teeth 11 on the inner end of pinion 4. Hence when shaft 1 is rotated sleeve 9 rotates therewith and rotates pinion 4. By making pinion 4 separate from the sleeve and locking it thereto by intermeshing teeth either part 4 or 9 can be renewed independently of the other, which is very desirable from a commercial standpoint, and by locking the pinion in place by means of the adjustable nut 3 the parts 4 and 9 can be adjusted lengthwise the shaft 1 to compensate for the wear on the friction parts to be hereinafter described. The sleeve 9 is provided at its inner end with the thrust flange or collar 12 and with the teeth 13, which intermesh with the teeth 14 on end of sleeve 15, which latter is provided with internal threads 16, meshing with threads 17 on shaft 1 and with a thrust flange or collar 18, which bears against the rear face of the friction-ring 19. This friction-ring 19 is provided with a hub 20, integral therewith, and the latter embraces and rests on the overlapping teeth 13 and 14 of the two sleeves and supports and carries the ratchet-wheel 21.

Located between the thrust flange or collar 12 and the front face of the ratchet-wheel 21 is the friction-disk 22, which latter may be secured to either flange 12 or ratchet-wheel 21 or left loose.

Projecting into the screw-sleeve 15 is the main shaft 23, which latter transmits motion from the motor (not shown) to driven shaft 1 through the parts described. Shaft 23 is provided with a groove 24, in which the spline 25 rests, the latter also resting in a corresponding groove in the sleeve 15. The sleeve 15 therefore rotates with shaft 23.

Secured in the end of shaft 1 is a grease-cup 27, and leading from the latter is a bore 26, extending through the length of the shaft, a portion of the threaded section 17 of the shaft being preferably grooved, as shown in Figs. 1 and 3, for the free passage of the grease back along the periphery of the shaft. With this construction the lubricant is forced throughout the length of the shaft and operates not only to lubricate the screw, but also all the friction-surfaces.

With the ratchet-wheel 21 mounted as described it rests between the thrust-collar 12 and the friction-ring 19. The pawls 27 are pivoted at 27ª to any stationary part of the apparatus adjacent to the ratchet-wheel, and each is provided with a friction-block 27ᵇ, which latter bears against the side of the rim of the ratchet-wheel. Hence when the ratchet-wheel is rotating in a direction to wind up the load the frictional contact between the wheel 21 and blocks 27ᵇ moves the ratchets 27 out of contact with the teeth of the ratchet-wheel. As soon, however, as the ratchet-wheel begins a movement in the reverse direction the friction between the rim of the wheel and blocks 27ᵇ positively carries the ratchet into engagement with the teeth of the ratchet-wheel and checks such movement. Hence when the pressure of the thrust-collar 12 and the friction-ring 19 is relieved from the ratchet-wheel, as is the case when unwinding or lowering a load, the ratchet-wheel will be engaged by the pawls 27 and locked against movement. The parts are so constructed that when shaft 23 begins to rotate in a direction to hoist the sleeve 15 by its engagement with the threads 17 of shaft 1 will be moved longitudinally, which movement operates through its thrust-collar 18 and ring 19 to force the ratchet-wheel solidly against the thrust flange or collar 12, and thus lock these parts together. The rotary movement of the sleeve 15 through the friction devices above described and also through its teeth 14 imparts rotary motion to the sleeve 9, and as the latter is keyed to shaft 1 it follows that the latter will also be rotated in the same direction. It will also be apparent that with the load suspended from the hoisting-drum the weight of the load will tend to turn the shaft 1 in the direction to lower; but as the shaft begins to turn the threads 17 of the shaft engage the threads 16 of sleeve 15 and apply the friction devices. To lower the load, the direction of rotation of the motor and shaft 23 is reversed, and as a reverse or backward movement of the ratchet-wheel is prevented by the pawl before referred to this reverse motion tends to release the friction between the ratchet-wheel and the friction parts. As soon as the friction is relieved the sleeve 15 tends to turn with sleeve 9 and the tendency of the parts is to race. As soon, however, as shaft 1 begins to race under the influence of the load the threads 17 thereon operate to move sleeve 15 in a direction to apply the friction to the ratchet-wheel, which, as before explained, is held against backward rotation, and as soon as the friction is applied the racing of the shaft is checked. This racing movement is hardly noticeable, as the endwise movement of sleeve 15 is very slight; but as it begins to race or turn faster than sleeve 15 is turned by shaft 23 the sleeve will be moved longitudinally and apply the brake. The continued movement of shaft 23 again separates the friction devices, thus allowing shaft 1 to rotate in a direction to lower the load, and these movements are continued until the load has been deposited. The movements of the sleeve 15 are in rapid succession and practically continuous, and hence are hardly noticeable to the eye.

It is evident that many slight changes might be made in the relative arrangement of parts herein shown and described without departing from the spirit and scope of my invention. Hence I would have it understood that I do not wish to confine myself to the exact construction of parts herein shown and described; but, Having fully described my invention, what I claim as new, and desire to secure by Letters Patent, is—

1. In an automatic brake, the combination with a main shaft and a driven shaft in line therewith, the latter having a screw-threaded section, of a sliding sleeve connected to the main shaft so as to rotate therewith and provided with internal threads engaging the threads on the driven shaft, and friction devices actuated by the longitudinal movements of said sleeve.

2. In an automatic brake, the combination with a main shaft a driven shaft in line therewith, a sleeve on the driven shaft, and a sleeve embracing the adjacent ends of both shafts and having a threaded connection with the driven shaft and a spline connection with the main shaft, of friction devices interposed between the adjacent ends of said sleeves and means for retaining one element of said friction devices against backward rotation.

3. In an automatic brake the combination with a main shaft and a driven shaft in line with the main shaft, a thrust collar or flange keyed to the driven shaft, and a sleeve having a threaded connection with the driven shaft and a spline connection with the main shaft, and provided with a thrust collar or flange, of a ratchet-wheel interposed between said thrust collars or flanges and means for preventing backward rotation of said ratchet-wheel.

4. In an automatic brake, the combination with a main shaft, a driven shaft in line therewith, a sleeve secured to the driven shaft and provided with a thrust collar or flange, a sleeve having a screw connection with the driven shaft and a spline connection with the main shaft, and provided with a thrust collar or flange, of a ratchet-wheel, means for preventing backward rotation of said ratchet-wheel, and friction elements between the thrust collars or flanges and the ratchet-wheel.

5. In an automatic brake the combination with a main shaft, a driven shaft having a central bore and a slot leading to said bore, a grease-cup secured to the end of the shaft in communication with the bore, a sleeve embracing the adjacent ends of the two shafts and having a screw connection with the driven shaft and a spline connection with the main shaft, and friction devices one member of which is restrained against backward rotation, the said friction devices being actuated by the longitudinal movement of the sleeve.

In testimony whereof I have signed this specification in the presence of two subscribing witnesses.

CLARENCE L. TAYLOR.

Witnesses:
D. FORDING,
C. W. CASSELMAN.